(12) United States Patent
Mundheim

(10) Patent No.: US 8,951,422 B2
(45) Date of Patent: Feb. 10, 2015

(54) APPARATUS AND METHOD FOR SEPARATION OF PHASES IN A MULTIPHASE FLOW

(71) Applicant: Sorbwater Technology AS, Bergen (NO)

(72) Inventor: Atle Mundheim, Omastrand (NO)

(73) Assignee: Sorbwater Technology AS, Bergen (NO)

( * ) Notice: Subject to any disclaimer, the term of this patent is extended or adjusted under 35 U.S.C. 154(b) by 0 days.

(21) Appl. No.: 13/683,071

(22) Filed: Nov. 21, 2012

(65) Prior Publication Data

US 2013/0075348 A1  Mar. 28, 2013

Related U.S. Application Data

(62) Division of application No. 12/762,650, filed on Apr. 19, 2010.

(30) Foreign Application Priority Data

Apr. 20, 2009  (WO) ................ PCT/NO2009/000150

(51) Int. Cl.
| | |
|---|---|
| *B03D 1/14* | (2006.01) |
| *B04C 5/181* | (2006.01) |
| *B04C 5/18* | (2006.01) |
| *B01D 19/00* | (2006.01) |
| *B01D 17/038* | (2006.01) |

(Continued)

(52) U.S. Cl.
CPC ............. *B04C 3/00* (2013.01); *B01D 17/0217* (2013.01); *B01D 19/0036* (2013.01); *B01D 19/0057* (2013.01); *B03D 1/1418* (2013.01); *B04C 5/181* (2013.01); *B04C 9/00* (2013.01); *C02F 1/24* (2013.01); *C02F 1/38* (2013.01); *B03D 1/04* (2013.01); *B04C 2009/008* (2013.01); *C02F 2101/32* (2013.01)
USPC ........ 210/788; 210/512.1; 210/704; 210/712; 209/716; 209/720

(58) Field of Classification Search
USPC ........ 209/716, 720; 210/788, 512.1, 704, 712
See application file for complete search history.

(56) References Cited

U.S. PATENT DOCUMENTS

| | | | |
|---|---|---|---|
| 2,179,919 A | * | 11/1939 | Carr et al. ..................... 564/416 |
| 2,590,691 A | | 3/1952 | Fontein |

(Continued)

FOREIGN PATENT DOCUMENTS

| | | |
|---|---|---|
| DE | 11 68 868 | 4/1964 |
| EP | 0 473 566 | 3/1992 |

(Continued)

OTHER PUBLICATIONS

USPTO RR mailed May 25, 2012 in connection with U.S. Appl. No. 12/762,650.

(Continued)

*Primary Examiner* — David C Mellon
(74) *Attorney, Agent, or Firm* — Foley & Lardner LLP

(57) ABSTRACT

A device is disclosed for the separation of liquid-liquid phase and/or a liquid-gas phase where one or more of the phases is suspended in water and has a bubble/drop/particle size in the sub micron and micron range, and/or fine particular organic or inorganic material is present in one or more of the phases. There is also disclosed a method and use for the device.

4 Claims, 1 Drawing Sheet

(51) Int. Cl.
*B01D 21/20* (2006.01)
*B04C 3/00* (2006.01)
*B01D 17/02* (2006.01)
*B04C 9/00* (2006.01)
*C02F 1/24* (2006.01)
*C02F 1/38* (2006.01)
*B03D 1/04* (2006.01)
*C02F 101/32* (2006.01)

(56) References Cited

U.S. PATENT DOCUMENTS

| | | | |
|---|---|---|---|
| 2,846,024 A * | 8/1958 | Bremi | 55/413 |
| 3,052,361 A | 9/1962 | Whatley et al. | |
| 3,696,927 A | 10/1972 | Jakobsson et al. | |
| 3,764,005 A * | 10/1973 | Zemanek | 209/733 |
| 3,928,186 A * | 12/1975 | Zemanek | 209/729 |
| 5,037,558 A | 8/1991 | Kalnins | |
| 5,451,318 A | 9/1995 | Moorehead | |
| 5,669,948 A | 9/1997 | Brottgårdh et al. | |
| 6,071,424 A | 6/2000 | Tuszko et al. | |
| 6,251,168 B1 * | 6/2001 | Birmingham et al. | 95/268 |
| 6,749,757 B2 | 6/2004 | Smith et al. | |
| 2005/0223685 A1 | 10/2005 | Bertram et al. | |
| 2006/0049120 A1 * | 3/2006 | Antoun | 210/787 |

FOREIGN PATENT DOCUMENTS

| | | |
|---|---|---|
| EP | 1 839 721 A1 | 10/2007 |
| WO | 2005/079946 A1 | 9/2005 |

OTHER PUBLICATIONS

USPTO NFOA dated Feb. 28, 2013 in connection with U.S. Appl. No. 12/762,650.
European Search Report dated Jun. 13, 2014 issued in connection with EP09807724.
Final Office Action issued in U.S. Appl. No. 12/762,650 dated Dec. 27, 2013.
Notice of Allowance issued in U.S. Appl. No. 12/762,650 dated Jun. 4, 2014.
Office Action issued in U.S. Appl. No. 12/762,650 dated Aug. 20, 2014.

* cited by examiner

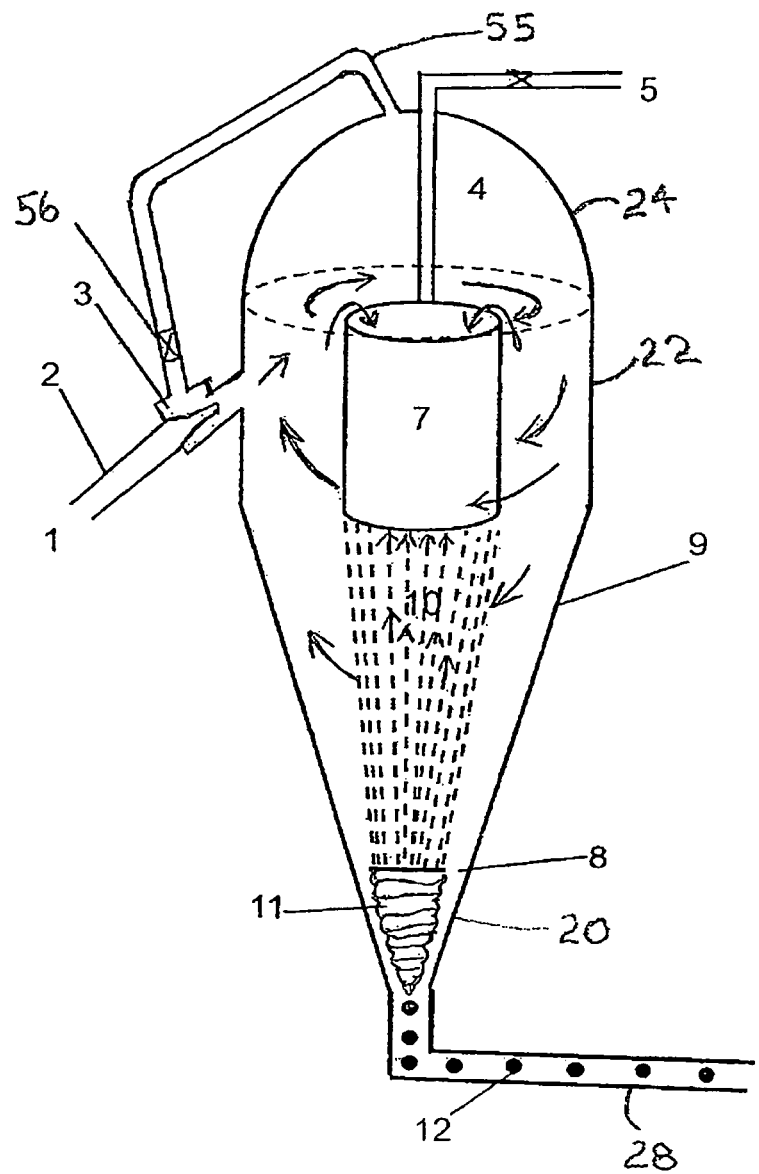

APPARATUS AND METHOD FOR SEPARATION OF PHASES IN A MULTIPHASE FLOW

The present invention relates to a method for improved separation of different phases in multiphase streams by phase separation and coalescence of one of more of oil hydrocarbons, gas bubbles, light particles and mixtures thereof, in a water stream, in, after, or before one or more of a cyclone tank and a flotation tank. The method involves generating, in a continuous stream in an outlet of separation device, a vortex under a vortex breaker which cannot escape against the direction of a liquid stream passing the vortex breaker, so that saturation of the vortex arises from one or more of gas and pollution dragged into the vortex, wherein under the vortex breaker in a conical outlet there is brought forth a saturated second vortex column wherein a pulsating pressure in the separation device causes a pulsating output of large drops of coalesced matter selected from oil, gas, particulates and mixtures of the same, from the second saturated vortex column under the vortex breaker.

More specifically, the invention relates to the separation of different phases in a liquid-liquid stream, a liquid-gas stream, or said streams where also fine particular solid matter may be a part of the stream, where this is to be separated. More specifically, the invention relates to an integrated device for gathering small oil drops and gas bubbles at the outlet of a flotation cyclone, so that these may be released with the liquid stream at the outlet of the clean water side of the flotation cyclone as large gas bubbles and large oil drops, which can very easily be separated in another flotation cyclone connected in series in the liquid stream or in another suitable separation device.

Furthermore, the invention relates to the dosing of a sorption agent in the flotation cyclone where the device is integrated.

The invention also relates to use of the device integrated in regular cyclone or flotation processes, or combination solutions of these, as it appears in the following independent and dependent claims.

The invention relates to the technology that concerns separating multiphase streams where the different streams have different net weight. It especially relates to separating oil, water and gas from produced water from the oil industry, but it also relates to separating organic and inorganic pollution in the same manner from general waste water as well as drinking water, where the net weight of the desired separated material can be brought to a net weight lower than the main liquid phase.

In hydrocarbons (oil/gas) that wells up from a formation to a production plant, there is also water and solid particles. The water phase that is separated early in the process plant is called produced water, and is released into the sea. It does however contain some oil in finely divided form, and therefore represents a pollution of the sea. Produced water should therefore be cleansed of this hydrocarbon before it is released.

The invention also relates to coalescing small drops of liquid of the same phase in a multiphase liquid-liquid stream into large drops of different phases.

The invention also relates to the coalescence of micron and submicron gas bubbles in a liquid phase into larger gas bubbles, where these have attached, as submicron and micro bubbles, to particulate and/or hydrophobic, and/or oleophilic pollution in the liquid phase. Micron refers to sizes of µm, and submicron refers to sizes smaller than 1 µm.

The invention also relates to dosing of a very light sorption agent in a flotation cyclone in order to bring this in contact with pollution in the liquid phase, so that the net weight of absorbed pollution in the liquid phase is significantly lighter, so that separation happens significantly easier in the flotation cyclone.

Known Methods

There are presently several variants of different hydro cyclones for separation of components of different net weight.

The most common feature is that the multiphase liquid is processed tangentially into the circular chamber of the cyclone, where a centered open cylinder contributes to a high rotation speed on the multiphase liquid. Centrifugal forces separate particles or liquid with the highest specific density out towards the outer wall of the chamber, while lighter liquid/gas is drawn to the cylinder at the center.

A vortex is formed under the cylinder where the phases of low net weight are gathered and pulled upwards in the cylinder, and the heavier phase follows the outer wall and are processed out through the outlet at the bottom of the cyclone.

The light phase gathered in a vortex under the centered cylinder will rise upwards inside the cylinder and exit through the outlet as reject if this phase is to be separated. If for instance particles or liquid with net weight bigger than what is to be kept is contamination (pollution), the reject will stay at the bottom outlet of the cyclone, and a clean phase will rise in the centered cylinder in the inlet chamber of the cyclone.

Separation suitability in multiphase streams as a consequence of difference in net weight, $\Delta SG$ (Delta Specific Gravity) under the influence of centrifugal forces is known to be approximately logarithmically proportional to the drop size of one of the phases to be separated. The smaller the $\Delta SG$, the larger the drop size needed for equally efficient separation. In the opposite case, with large $\Delta SG$ in the different phases in a stream, smaller particles/drops can be separated with the same centrifugal force.

For flotation submicron air/gas bubbles are therefore desired in order to attach these to pollution in liquid, so that the pollution can achieve a low net weight.

It is known that by saturating air/gas in liquid (water) under pressure, oxygen/gas will expand with pressure reduction as oxygen/gas bubbles of submicron size. It is further known that produced water in the oil industry is processed from reservoirs under relatively high pressure. During further surface separation of oil/water/gas the pressure is released in the different separation steps prior to release into the sea or re-injection of water. It is know that gas bubbles then will be released with a size down to a few micron, and also gas bubbles smaller than 1 micron. It is also known that some of the oil in the water that is most difficult to separate is on the size order of 5 to below 1 micron.

It is also known that gas may be added prior to a flotation cyclone, as well as be recycled in a flotation cyclone for purification of oil from produced water.

It is known that success criteria for efficient separation in a flotation cyclone where gas bubbles are attached to pollution in order to achieve net weight difference is dependent on bubble size. A larger amount of smaller bubbles have a better chance of connecting with pollution with subsequent attachment. Small bubbles are slower to separate, and have a better chance at coming across pollution if the process provides enough time for this.

It is known that a gas bubble can bind an oil drop by adhesion with a relatively weak binding to the oil drop, or by the oil drop encapsulating the gas bubble, where this binding is formidably stronger.

It is known that adhesion is the most prominent of the well-known flotation processes, and that gas bubbles in this case remove oil drops of their own size or larger.

It is also well-known that the utilization of micro bubble flotation in known flotation techniques means needing 3 times as long of a residence time in the flotation tank in order for the bubbles attached to pollution to have time to rise up to the skimmer/separation area. It is also known that a 30-200 micron bubble size on air/gas requires a tank with a surface area of 10 m$^2$ and a height of more than 2.6 m pr. 100 m$^3$/t processed water with regular flotation techniques. The reason for this is to prevent a short circuit stream of air/gas/pollution to be pulled out to the clean water side at the bottom of the flotation tank.

It is also known that there have been made so-called hybrid solutions where flotation, cyclone, and air/gas stripping principles have been combined in one unit. These units have a typical flow speed of optimally 40 seconds. Polluted water mixed with gas is brought tangentially into a cylindrical tank. An inner cylinder covering ⅓ of the total height of the tank is typically placed in the center, corresponding to the vortex finder cylinder in a standard cyclone, in order to increase the rotation speed on the liquid. The speed is then interrupted under the cylinder and a vortex is created below the inner cylinder. Polluted material with gas flows up into the inner cylinder and is led away, and clean water is led out at the bottom of the cylinder tank.

This is described in patent applications U.S. Pat. No. 6,749, 757 B2, and WO 2005/079946 A1, among others.

The oil and gas industries creates large emissions of produced water that requires cleansing. Emissions occurs when 30-80% water mixed with oil/gas is produced from the reservoirs. Water/oil/gas is separated at the fields, and the water fraction which is not injected to the reservoir is released to the recipient after going through different cleansing processes to lower the hydrocarbon content. Two water streams is typical for one field. "A clean water stream" from pressurized separator typically has a volume of 10,000-100,000 m$^3$ water per day, depending on the size of the field. This first step of separation can take the oil content down to 10-40 mg/l. The drop size of remaining oil fraction, which the present technology does not capture, is typically the portion below 5-10 micron.

In the second and third separator step of the oil/gas/water separation, 1,000-5,000 m$^3$ polluted water a day is typically generated on an offshore field. This water, called "dirty water stream", typically has an oil content varying from 100-1,500 mg/l. This is usually cleaned using flotation or coalescence filters and flotation. Known technologies will not extract oil drops smaller than 5-10 micron, and emissions therefore vary from 10-40 mg oil hydrocarbons/l.

Known technologies used for cleansing comprise the following:
Cyclones where oil is mechanically separated from water.
Combined feed of condensate under pressure for upgrading oil drop size with subsequent separation in a cyclone.
Flotation cells where oil is floated out using gas flotation (very light hydrocarbons, so-called fuel gas, or nitrogen as flotation vehicle).
Combined flotation/cyclone/gas stripping where flotation takes place in a vertical straight cylindrical tank with tangential feed of liquid, and where a vortex breaking plate is mounted at the bottom of the straight tank with a rounded bottom and top.
Coalescence of oil drops in a liquid stream using media or plates inserted in the liquid stream.
Adsorption in prepared media filters.

All known processes may use flocculants or extraction agents to increase the effect of the processes.

The limitation of the known methods is that they are not well-suited for treatment of the large volumes of waste water generated, when it comes to removing oil drops smaller than 5-10 micron. This is for example one of the main reasons why the average emission of oil in water produced by the oil and gas industry today is approximately 16 mg/l in the North Sea.

It is an aim of the present invention to bring forth a new and improved device, placed in a continuous process water stream in a multiphase separating flotation cyclone, which at the release of gas caused by the pressure drop at the inlet of the flotation cyclone, or by feeding gas, micro bubble gas or gas pressure saturated liquid, makes possible the separation of oil/water/particles/gas with a drop/particle/bubble size also smaller than 5-10 micron, without such micro bubble gas feed requiring longer residence time in the separation chamber for efficient separation.

It is furthermore an aim of the present invention to bring forth a new and improved method for separating oil hydrocarbons from water, and especially oil drops smaller than 5-10 micron, in a compact flotation cyclone utilizing a feed of, or the presence of, gas saturated liquid and micro bubble gas in the process water stream in front of the device.

It is furthermore an aim of the present invention to bring forth a new and improved method for separating oil from water in accordance with the aforementioned aims by also combining a use of the device where the process water is process with gas saturated water and micro bubble gas alone, or where additionally a flocculant and/or finely dispersed extraction agent is used and/or light and pulverized sorption agent dosed to increase the net weight difference of absorbable pollution and water phase and thereby increase the degree of purification in the flotation cyclone.

It is an aim of the present invention to bring forth uses for separating organic and/or inorganic pollution in a continuous liquid stream.

The device, the methods and the uses according to the present invention are characterized by the features evident from the characteristics of the following independent claims.

Further features of the present invention are indicated in the dependent claims.

The present invention discloses a device which makes it possible to separate oil hydrocarbons, including with a drop size of less than 5-10 micron, from water, where there is gas in the liquid phase, or where infusion of micro bubble gas or gas pressure saturated water in a continuous liquid stream with vigorous mixing can be added.

According to the present invention, there has been brought forth a device which makes it possible to separate oil hydrocarbons, including with a drop size of less than 5-10 micron, without this resulting in the mentioned small bubbles and oil drops requiring an increased residence time in a cyclone or a flotation cyclone in order to be separated from oil hydrocarbons.

Furthermore, a phase separating device has been brought forth which uses the centrifugal force to increase the drop and bubble size of oil drops and free gas, so that oil/gas, as the mixture leaves the traditional separation chamber in cyclones or flotation tanks, is coalesced and separated as large drops/bubbles which can be separated in a new flotation cyclone connected in a series, without demands for the well-known increased residence time for separation of micro bubbles/drops by regular micro bubble flotation.

A device has been brought forth for increasing bubble, drop and gas size in a multiphase process water stream, as well as improved separation of the phases for use as combined vortex breaker and former of a second super powerful vortex in a cyclone or a flotation cyclone/flotation tank in order to particularly improve separation of submicron drops/bubbles/particles in the process water.

A device has been brought forth for increasing bubble, drop and gas size in a multiphase process water stream, as well as improved separation of the phases, to be used as immediately integrated second treatment step in a cyclone/flotation tank to particularly improve separation of submicron oil drops/bubbles/particles in the process water which otherwise would be dragged through the separation step due to its micron/submicron state.

The present invention is characterized by placing the device in a flotation cyclone/flotation tank with tangential inlet, vortex finder, and outlet for reject stream and main stream, through which the main stream is processed at an adequate speed to cause multiphase separation as a consequence of the gravitational pull on the phases of different net weight.

The invention is further characterized by processing the polluted liquid with gas/pollution phases with different net weight through the flotation cyclone/flotation tank wherein the main portion of the phases coalesce and some micro gas bubbles encapsulated by oil and coalesced oil/other pollution is led to the outlet in a traditional flotation cyclone or flotation, wherein the device placed in a conical outlet part of the main chamber in the flotation cyclone/flotation tank forms a super strong second vortex which pulls in residual gas/drops, which otherwise would follow the outlet stream as unpurified pollution.

The present invention is further characterized by that the device placed at the outlet of the flotation cyclone/flotation tank holds the super strong vortex column uniformly to release large bubbles of gas/oil/light matter pulsating as the submicron bubbles/oil drops/light matter appear from the liquid stream is drawn into the saturated vortex column and thereby over saturates the uniform vortex column, whereupon this releases large bubbles and large coalesced/agglomerated fractions at the outlet of the cone.

The present invention is further characterized by the option of using the device in combination with use of dosing of light extraction fluids, pulverized light sorption agent, or flocculants.

According to a preferred embodiment of the present invention, a separation and coalescence inducing vortex breaker is placed inside a conical flotation cyclone/flotation tank, contributing to an additional separation step for submicron and low micron sized pollution. The vortex breaker is a round plate centered in the cone, and it functions as an ordinary vortex breaker, and stabilizes a traditional vortex column up against a vortex finder, while it simultaneously, outside the plate, releases liquid phase to the outlet. At the same time, the plate blocks the second vortex formed below the breaker in the continuation of the cone, so that a saturated gas vortex column is formed which does not migrate upwards in the cyclone past the breaker.

In a preferred embodiment of the present invention the round plate is placed at an adequate distance from the outlet of the cone in order for a uniform vortex to form under the breaker, and after gas/oil saturation lies against the underside of the vortex breaker as a uniform gas/oil cone where water spins at great speed past the vortex cone.

In a preferred embodiment of the present invention, the water spin is accelerated downwards in the cone, and the distance from the cone to the vortex breaker is such that the rotation speed/downward moving speed in the cone prevents the second gas vortex from escaping past the vortex breaker upwards in the tank.

In a preferred embodiment of the present invention, the distance from the vortex breaker to outlet of the cone is large enough for a constant gas/light liquid/light matter vortex to form under the vortex breaker, whereby this significantly accelerates the spin in water between underside of the vortex breaker and the outlet of cone, so that he vortex as a consequence of a constant feed of light submicron bubbles of gas/oil/light matter is saturated into a uniform gas cone with light pollution/coalesced oil where the oil is mainly gathered at the bottom of the gas cone.

The present invention is further characterized by the possibility of placing the device in a closed flotation cyclone and with applied gauge pressure that in a pulsating manner purges reject and gas/air so that the saturated second vortex thereby releases, point by point, large coalesced drops in an even stream by oversaturation as a consequence of the small pressure variations in the tank caused by the pulsating purging of reject.

The present invention is characterized by the option of using a flocculant and/or a light sorption agent dosed before, after or in the flotation cyclone, where the device according to the invention is integrated.

The present invention is brought forth to be used in a cyclone, a flotation cyclone/tank where traditional separation of phases with different net weight takes place over vortex breaker whereby the invention is used as a second separation step, where separated matter from this step may be sent to a new separation, a cyclone, a flotation cyclone/tank for easy separation, or a separate integrated separation chamber.

The present invention may also be brought forth to be used in a traditional cylindrical flotation cyclone or tank, with a tangential inlet where vortex breaker is placed over conic outlet so that spin as described is induced, and so that a saturated gas column with the described characteristics arises under the vortex breaker.

Advantages of the Present Invention

The present invention distinguishes itself from existing processes/inventions by a vortex breaker in a flotation tank/flotation cyclone/cyclone with a conic outlet by placing a vortex breaker at sufficient distance from outlet producing a second vortex below the breaker, where gas and/or multiphase liquid with different net weight, or other easily absorbed/extracted liquid in processed fluid phase forms a very powerful vortex uniform column of gas and/or light liquid phase, and/or sorption agent in a saturated vortex column. This column is saturated by coalescing submicron and low micron particular gas/oil/extraction agent/sorption agent, which normally would escape the tank in its original form.

The invention further distinguishes itself from known technologies by the surprising discovery that the saturated conic vortex captured under vortex breaker periodically releases large gas bubbles and/or large oil drops/extraction agents/coagulated sorption agents, which in a following separation step are easily removed. This release happens from oversaturation of gas in the second vortex and/or from the pulsating gauge pressure in the flotation cyclone caused by pulsating purging of reject pollution/gas.

The present invention distinguishes itself from existing processes/inventions by making possible the use of gas pressure saturated water and micro bubble injection in process water streams to achieve improved separation of phases between different phases in liquid stream without this resulting in the residence time in separation equipment, and without dimensions of separation equipment having to be increased as a consequence of submicron and micron bubbles needing larger separation volume in the separation chamber.

The present invention distinguishes itself from existing inventions in that far more finely dispersed water/gas/oil is post separated under the vortex breaker itself in a second vortex in a hydro cyclone/flotation cyclone or in a flotation tank into large coalesced drops/conglomerates, which is easily separated in an integrated separation chamber or in a new separation step.

The present invention distinguishes itself from existing processes/inventions in that gas naturally present in a pressurized liquid stream by relief of pressure can be removed by separating gas bubbles from 10-5 micron and also under 1 micron in an extreme gravitation applied by the second vortex under a vortex breaker in a conic outlet of a pressurized flotation cyclone, and that one from this removal also achieves significantly better removal of oil drops of the same size.

The device according to the invention shall be explained in further detail in the following description with reference to the corresponding FIGURE:

FIG. 1 shows the device placed in a closed flotation cyclone where (1) Tangential inlet process water (alternatively mixed with flocculant or hydrocolloid).
(2) Injection of pressure gas saturated water/micro bubble gas/light sorption matter.
(3) Ejector for recycling gas/acceleration of spin in cyclone.
(4) Gas pocket contained above vortex finder.
(5) Reject oil/gas.
(6) Valve reject for achieving gauge pressure in tank.
(7) Traditional vortex finder.
(8) Vortex breaker plate.
(9) Conically shaped flotation cyclone tank.
(10) Traditional first Vortex between the vortex finder and vortex breaker.
(11) Saturated Second vortex below vortex breaker.
(12) Release [/emission] of large coalesced gas bubbles/oil drops from the second vortex at the outlet of the flotation cyclone.

FIG. 1 shows a device in accordance with the present invention for carrying out the method according to the invention.

The device comprises a treatment tank 9 (flotation cyclone tank) with a conically shaped bottom part 20 (like a cornet), and an upper cylindrically shaped tank part 22, as well as a upper top part 24 that may be dome shaped. This is just a shape example. In the bottom tip of the conical section 20 there is an outlet 26 where to a diversion pipe 28 is mounted.

In the upper part and in the middle of tank 9 there is placed a common vortex finder 7, which is a cylindrical body for influencing the streams and the separation in tank 9 in a favorable manner.

In the upper half of tank 9 there is located a pipe 1 for additions, which is arranged tangentially, for tangential inlet of fluids to be treated. From the top of vortex finder 7 a pipe 5A is arranged, which stretches upwards and out through the upper top part 24. This pipe continues on as pipe 5B, wherein a valve is mounted for regulating the outlet of oil/gas as will become apparent in the following.

In addition to outlet pipe 5, a second pipe 55 runs out of the top of the top part 24, and is coupled onto inlet pipe 1. This pipe 55 also comprises a valve 56 used for regulating streams from a gas pocket 4, which is located above the vortex finder 7 when the device is in use. A coupled ejector 3 on pipe 55 is used for recycling gas from pocket 4.

More detailed for the process carried out by the present invention, FIG. 1 shows how oil-containing water with gas or added gas/sorption agent/flocculent/extractant is tangentially led into a closed traditional flotation cyclone (1), where gas with the aid of an ejector (3) is recycled from the gas pocket (4), which is maintained above the vortex finder (7), contributing to increased spin and coalescence of smaller drops/bubbles, as well as stripping of oil/gas upwards in the tank. Gas pocket (4) above vortex finder (7) is maintained with a gauge pressure typically smaller than 1 bar by having the reject tube subjected to counter pressure above the valve (6), whereby oil floated to top liquid level by top vortex finder (7) blown out reject tube as a consequence of the gauge pressure, and when the reject tube (5) slurps gas the gauge pressure will drop a little, so that the oil level/liquid level again reaches above the inlet of the reject tube. The cycle is repeated continuously, and in this manner separated oil is emptied pulsating from the tank through the reject tube (5). The ejector (3) which recycles gas for stripping of oil drops/small gas bubbles mainly in the upper part of the flotation cyclone, also functions as a release trigger for smaller gas bubbles/submicron bubbles by pressure being released over this. ΔP over ejector (3) can typically be 0.5 bar, but also a differential pressure up to 15 bar can be charged over the ejector (3), and this releases a large fraction of very small gas bubbles that are not removed in the short residence time in the conically shaped flotation cyclone (9), where the typical residence time of the liquid is between 25-60 seconds. Furthermore, the ejector (3) will with its construction function give extra speed to the water which is brought tangentially into the flotation cyclone, so that the speed of the spin is increased around a traditional vortex finder (7). The speed of the spin is further increased downwards in the flotation cyclone as a consequence of the conic shape of the tank (9). A vortex column of gas and light liquid/light particles are drawn towards the center of the cyclone tank (9) and stop at the Vortex breaker plate (8), and thereby a vortex number 1 is formed between vortex breaker (8) and vortex finder (7). In this, oil, gas bubbles and light particles are led upwards in the tank through vortex finder (7) to liquid surface against gas pocket (4) where separated components are led to reject through (5). Under vortex breaker plate (8) there is by the strong accelerated spin as a consequence of the conic shape of the cyclone outlet and cyclone tank (9). This spin combined with a negative pressure forming under the vortex breaker plate (8) as a result of the kinetic energy of the liquid out the outlet of the cyclone tank, resulting in the very small and difficult to separate oil drops and gas bubbles separating and forming a uniform gas cone (11) with coalesced oil at the bottom under the vortex breaker plate (8). By saturating this gas cone with coalesced oil (11) this releases large coalesced drops of oil/gas bubbles (12) out through the outlet of the flotation cyclone, and these are easily separated in a new separation step. Such release is also enhanced by the pulsating gauge pressure in the tank as a result of the pulsating reject emission through (5) over (6).

Test 1:

5000 l water was mixed with raw oil at 240 mg/l. Mixing was carried out in a shear mixing pump of type EDUR EB4u multiphase pump without mixing in gas. Measurements of the particle size of the oil drops showed that 24 ppm of mixed raw oil had a particle size of less than 5 micron.

An attempt was made to remove oil using an injection of air bubbles in front of a compact cylindrical cyclone/flotation tank with an injection of gas bubbles added in a standard injection mixer. The tank had a cylindrical vortex finder and a vortex breaker plate placed 8 cm over curved bottom with outlet at the center of the curve. Typical gas bubble size was 50-150 micron. It was processed with process water polluted by oil with an intake rate of 1.6 m³/t.

Up to 45 ppm oil hydrocarbon was removed from purified water. 20 ppm of the measured residual pollution had a drop size of less than 10 micron. The test used a compact cyclone/flotation tank with residence time for process water stream of 40 seconds.

Test 2:

The tank from test 1 was then opened and a loose cone from the bottom of the vortex finder was placed against the outlet of the tank so that the actual treatment tank was given an appearance as shown in FIG. 1. The reduced volume resulted in a decrease in residence time to 22 seconds, but the liquid received a powerfully accelerated spin. The same polluted water was processed, with the result of only 12 ppm oil coming through. The drop size of what came through was several hundred micron, and only 1-2 ppm had a drop size of less than 10 micron. The tests were carried out in Plexiglas tanks and with Plexiglas tubing. It was observed that the water was free of small gas bubbles after outlet as the second vortex below the vortex breaker plate had stabilized. It was furthermore observed that the uniform vortex cone under the vortex breaker plate released large gas/oil drops which appeared like pearls on a string in the outlet tube. The test clearly showed that the small drops which passed without being purified in test one were now coalesced in the vortex column and were released as large drops, and that the same thing happened with the smallest drops.

Test 3:

The configuration from test 2 was used, only this time an additional tank was connected to the first tank in a series. This was done in order to be able to separate the large coalesced drops which were detected at the outlet of tank 1 in test 2.

The result was that now, after tank 2, there was only 1-2 ppm oil in the discharge water. All oil in the discharge had a particle size of less than 1 micron. The test showed that the device used in a flotation cyclone coalesces oil drops smaller than 1 micron so that these can be separated in a purification step 2. Such small oil drops cannot be separated using known technology.

Test 4:

The configuration from test 3 was used, with the difference that this time a heat activated peat moss powder was dosed between tank 1 and 2 as a sorption agent. This was attempted dosed both wet as slurry, and dry as powder. In both cases 3 ppm heat activated peat moss was dosed, which was completely removed in flotation cyclone 2. In both cases the oil content in the discharge water was below the limit for detection for the analysis at 0.3 ppm.

The invention claimed is:

1. Method for treating a continuous stream of fluid, as a stream to be treated, comprising water, hydrocarbons, gas, and other light particles, by separating a light phase from a water phase, and by coalescing small drops or bubbles to larger drops or bubbles, comprising the steps of
    guiding a stream to be treated tangentially into a treatment tank having a cylindrical upper part with a vortex finder and a conical bottom part with a vortex breaker, at such speed that one vortex is created above the vortex breaker, and a second vortex is created below the vortex breaker, and the vortex breaker in the treatment tank is arranged at such a distance from the conical bottom part that the stream to be treated, which is moving downward in the conical bottom part prevents the light phase separated in the second vortex from escaping upwards in the treatment tank past the vortex breaker,
    removing parts of the light phase through an upper outlet, the upper outlet is a pipe which stretches from a top of the vortex finder, upwards and out through the treatment tank,
    removing the water phase through an outlet in the conical bottom part of the treatment tank,
    regulating removal of the light phase in such a way that a gas pocket of released gas forms in the cylindrical upper part of the treatment tank,
    removing parts of the gas from the gas pocket, and recycling it to the stream to be treated, by means of an ejector,
    regulating the stream to be treated, and removal of the water phase, the gas and the light phase in such a way that a gauge pressure is obtained and maintained in the treatment tank,
    further regulating removal of the light phase and the gas in such a way that the light phase and the gas is at a same level as the outlet for the light phase, and that a pulsating pressure in the treatment tank is obtained when the outlet for the light phase alternatingly removes the light phase and the gas, wherein this pulsating pressure effects release of large coalesced drops from the light phase of the second vortex into the water phase being removed through the outlet at the bottom of the treatment tank.

2. Method according to claim 1, wherein gas is injected to the stream to be treated, previous to an inlet to the treatment tank.

3. Method according to claim 1, further comprising a step of injecting light sorption material in the stream to be treated, or into the treatment tank.

4. Method according to claim 1, wherein the water phase removed from the outlet in the conical bottom part of the treatment tank, is further treated in a second separation device.

\* \* \* \* \*